US012700697B2

(12) United States Patent
Buck et al.

(10) Patent No.: US 12,700,697 B2
(45) Date of Patent: Aug. 4, 2026

(54) CONNECTOR WITH CONNECTOR POSITION ASSURANCE

(71) Applicant: TE Connectivity Solutions GmbH, Schaffhausen (CH)

(72) Inventors: Carsten Buck, Bensheim (DE); Maximilian Veihl, Bensheim (DE)

(73) Assignee: TE CONNECTIVITY SOLUTIONS GMBH, Schaffhausen (CH)

( * ) Notice: Subject to any disclaimer, the term of this patent is extended or adjusted under 35 U.S.C. 154(b) by 347 days.

(21) Appl. No.: 18/439,065

(22) Filed: Feb. 12, 2024

(65) Prior Publication Data

US 2024/0275106 A1 Aug. 15, 2024

(30) Foreign Application Priority Data

Feb. 13, 2023 (DE) ......................... 102023103379.4

(51) Int. Cl.
*H01R 13/629* (2006.01)

(52) U.S. Cl.
CPC .............................. *H01R 13/62933* (2013.01)

(58) Field of Classification Search
CPC ........................ H01R 13/62933; H01R 13/641
USPC ......................................... 439/345, 352, 489
See application file for complete search history.

(56) References Cited

U.S. PATENT DOCUMENTS 6,716,052 B2 * 4/2004 Kane .................... H01R 13/641 439/352
7,351,089 B2 * 4/2008 Neale, III .......... H01R 13/6277 439/352
12,046,856 B2 * 7/2024 Fischer ............ H01R 13/62938
2004/0157486 A1 * 8/2004 Brown ................. H01R 13/641 439/489
2004/0192090 A1 9/2004 Flowers et al.
2013/0330959 A1 12/2013 Bashkin et al.
2017/0288342 A1 * 10/2017 Nicolas .............. H01R 13/6271

FOREIGN PATENT DOCUMENTS

DE 10032234 A1 1/2002
DE 102021112425 A1 11/2022
EP 4012847 A1 6/2022

(Continued)

OTHER PUBLICATIONS

Search Report for corresponding DE Application No. 102023103379.4 dated Sep. 25, 2023 (27 pages).

(Continued)

*Primary Examiner* — Gary F Paumen
(74) *Attorney, Agent, or Firm* — Jay J. Hoette; Carroll, Hoette & Butscher, LLC

(57) ABSTRACT

A connector for connecting to a mating connector includes a transmission element which extends along a mating direction and is mounted movably with respect to the housing of the connector between a mated position, in which the connector and the mating connector are connected, and a disconnected position, in which the connector and the mating connector are disconnected. In the disconnected position of the transmission element, an unlocking element prevents a CPA from being movable into the locked position. In a mated position of the transmission element, the unlocking element allows the CPA to be movable into the locked position.

20 Claims, 8 Drawing Sheets

(56) References Cited

FOREIGN PATENT DOCUMENTS

| | | | |
|---|---|---|---|
| JP | 2022092594 | A | 6/2022 |
| KR | 102478092 | B1 | 12/2022 |

OTHER PUBLICATIONS

Office Action for corresponding KR Application No. 1020240019399 dated Feb. 24, 2025 (7 pages).

Office Action for corresponding JP Application No. 2024016840 dated Dec. 17, 2024 (3 pages).

Extended European Search Report for corresponding EP Application No. 24156975.5-1201 dated Ju. 27, 2024 (9 pages).

Office Action in corresponding IN Application No. 202444008523, dated Apr. 23, 2026, (9 pages).

* cited by examiner

CONNECTOR WITH CONNECTOR POSITION ASSURANCE

CROSS REFERENCE TO RELATED APPLICATIONS

This application claims the benefit of DE Application No. 102023103379.4 filed 13 Feb. 2023, the subject matter of which is herein incorporated by reference in its entirety.

BACKGROUND OF THE INVENTION

The subject matter described herein generally relates to a connector with a connector position assurance (CPA). In particular, the subject matter relates to a connector for connecting to a mating connector, for example a pin header. Such connectors are used in particular for high-voltage connections, such as those required in the automotive industry.

CPAs are designed to interlock, for example wedge, connectors and mating connectors that are correctly connected. Interlocking is an intentional and sometimes necessary blocking. The CPA is moved from an open position to a locked position by actuation, for example by a user. In an open position of the CPA, the connector and the mating connector are separable. In a locked position, the connector and the mating connector are locked.

In CPAs, a coupling mechanism is used when a connector is connected to a mating connector to hold the connector and mating connector together when a conductive connector connection is formed. The coupling mechanism is designed to withstand forces in the locked position of the CPA that would pull the connector and mating connector apart and break the connection.

In the locked position of the CPA, unwanted conditions, such as an unsafe contact position between the connector and mating connector, can thus be prevented. It is also intended to prevent accidental actions that could cause damage. Deliberate action is usually required to release the interlock. An interlock is designed in such a way that it cannot be overridden accidentally. At the same time, however, the locking mechanism itself should not be (too easily) activated accidentally. The latter could give a false sense of security, for example that the connector and the mating connector are correctly connected, which they are not.

To convey the information that the connector and the mating connector are correctly connected, CPAs can be installed close to a mating connector receptacle. For example, a CPA is arranged close to the connection point between the connector and mating connector. As long as the connector and the mating connector are not connected, the CPA cannot be moved into the locked position. Only a part of the mating connector that engages with the CPA when the connector and the mating connector are connected allows the CPA to move into the locked position.

With some connectors, however, the available installation space prevents the CPA from being installed close to the mating connector receptacle. Communicating the information that the connector and the mating connector are correctly connected then requires more complicated measures or the information that the connector and the mating connector are correctly connected is not communicated.

A need remains for a connector with a connector position assurance (CPA) that is cost effective and reliable to provides information that the connector and the mating connector are correctly connected.

BRIEF DESCRIPTION OF THE INVENTION

In an embodiment, a task of the invention is to provide a connector with a CPA that provides information that the connector and the mating connector are correctly connected. In an embodiment, a task that the CPA can be provided remotely from the mating connector receptacle. In an embodiment, a task to reduce the complexity to convey the information that the connector and the mating connector are correctly connected. In an embodiment, for connectors that are large, for example because they provide a latching element, it is a task to convey the information that the connector and the mating connector are correctly connected. In an embodiment, it is a task that known connectors can be modified in such a way that they enable information that the connector and the mating connector are correctly connected to be conveyed without changing the installation space specifications for the known connectors.

The above tasks are solved by the subject matter of the independent claim. Advantageous further developments are the subject of the dependent patent claims.

The tasks are solved in that a transmission element, for example an unlocking rod, is mounted in the connector. The transmission element moves when a mating connector, for example a header, is connected to a connector. This is possible because the transmission element interacts with the mating connector so that the transmission element is moved from a disconnected position to a mated position when the mating connector and the connector are connected. Thus, the transmission element conveys the information to the connector that the connector and the mating connector are correctly connected. When the connector and mating connector are fully mated, a CPA is unlocked, i.e. when the transmission element is moved to its maximum position, and it is then possible to move the CPA. The transmission element thus interacts with both the mating connector and the CPA, thereby enabling a CPA to be moved to a locked position only when the connector and mating connector are correctly connected.

Detailed aspects of the connector with a CPA described herein are detailed below.

A first aspect relates to a connector for connecting to a mating connector. A connector and a mating connector are connecting parts and together form a connector system. The connector system is used in particular for separating and connecting electrical lines, but also lines for optical signals, for example. The connecting parts can be aligned appropriately by form-fitting the connecting parts.

The connector of the first aspect comprises a housing. The housing serves to accommodate the lines. The connector and the mating connector are movable relative to each other in a mating direction in order to fit the connecting parts together. Typically, the mating direction is identical to the orientation of pin contacts, which are arranged, for example, on the connector or the mating connector.

The housing of the connector includes a mating connector receptacle at one mating connector end. The mating connector receptacle enables the connector to form a positive fit with the mating connector.

Furthermore, the housing extends in the connector direction to a connector end opposite the mating connector end. In other words, the connector end is a housing area of the connector that is remote from the mating connector end. This makes it possible to provide installation space for further components of the connector between the connector end and the mating connector end. There are side walls between the connector end and the mating connector end that run parallel to the mating direction. The side walls provide installation space, for example for a cable area for routing lines out of the connector. The side walls can also provide installation space for a latching area for arranging a latching element.

The connector of the first aspect comprises a connector position assurance (CPA) for securing the contact position of the connector to the mating connector. The CPA is provided at the connector end. In other words, the CPA is provided remote from the mating connector end. This makes it possible to fulfill space-related requirements between the CPA and the mating connector receptacle, i.e. on a side wall. Providing a connector with a CPA at the connector end allows a common part to be used for different size variants of connectors.

The CPA, as already described above, is adapted to be movable between an open position, in which the connector and the mating connector are separable, and a locked position, in which the connector and the mating connector are locked.

The connector of the first aspect comprises at least one transmission element or also a plurality of transmission elements. The transmission element is provided in and/or on the housing. Thus, an existing connector can be modified without changing installation space specifications for a connector if the transmission element does not protrude beyond a housing circumference. In particular, all interface contours of known connectors can remain the same. The transmission element can be realized as a simple part, for example as a rod, and can be easily installed in existing housings, possibly with a conversion kit. A rod is understood here in particular as a narrow, long, especially inelastic object with, for example, a round or approximately square cross-section.

The transmission element extends along the mating direction. Thus, the transmission element can convey information along the mating direction as to whether the connector and the mating connector are correctly connected. Furthermore, the transmission element is mounted movably with respect to the housing between a mated position, in which the connector and the mating connector are connected, and a disconnected position, in which the connector and the mating connector are disconnected. The bearing allows the transmission element, which is movable relative to the housing, to move in a guide. For example, the transmission element is movably mounted in a channel as a guide for the housing. A channel is a tube, for example. A tube is an elongated hollow body whose length is usually significantly greater than its diameter.

The connector of the first aspect further comprises a mating connector passageway at the mating connector end of the housing. The mating connector passageway is adapted to allow the mating connector to cooperate with the transmission element.

In other words, a movement of the mating connector in the mating direction causes a movement of the transmission element. For example, the mating connector passageway is a passageway that allows at least a portion of the transmission element to protrude out of the guide in the mating direction through the mating connector passageway and/or allows at least a portion of the mating connector to protrude into the guide in the mating direction through the mating connector passageway. The mating connector passageway is further arranged to move the transmission element from the disconnected position to the mated position when the mating connector is connected to the connector. Thus, the transmission element can transmit information as to whether the connector and the mating connector are correctly connected as soon as the connector and the mating connector are connected or disconnected.

The connector of the first aspect further comprising a connector end passageway at the connector end of the housing for passing an unlocking element connected to the transmission element. For example, the unlocking element is an unlocking end of the transmission element. Alternatively, the unlocking element is an unlocking part of the CPA.

In the disconnected position of the transmission element, the unlocking element prevents the CPA from being movable into the locked position. For example, an unlocking end does not protrude through the connector end passageway, but is recessed in the guide. Alternatively, an unlocking part of the CPA can protrude through the connector end passageway.

In the mated position of the transmission element, the unlocking element allows the CPA to be moved into the locked position. For example, the unlocking end protrudes through the connector end passageway. Alternatively, an unlocking part of the CPA may not protrude through the connector end passageway. Thus, the transmission element can pass information on whether the connector and the mating connector are correctly connected as soon as the connector and the mating connector are connected or disconnected to the CPA by means of a mechanical movement.

A second aspect relates to a connector of the first aspect, wherein the connector comprises a locking element at the connector end. A locking element may be provided on the CPA or on an outer surface of the connector. The locking element can be moved by the unlocking element between a not-release position and a release position, wherein the release position of the locking element allows the CPA to move to the locked position. For example, the locking element is a spring element that is deflected by a force transmitted by the unlocking element. The locking element is therefore more elastic than the unlocking element.

In particular, the unlocking element and the locking element form a lock that holds the position of the movable locking element relative to the connector, for example a block element on the CPA or the connector, until the unlocking element is in the mated position. Advantageously, the locking element is attached to the CPA, as this minimizes modifications to the housing of the connector.

A third aspect relates to a connector described above in the first to second aspects, wherein the connector comprises a block element at the connector end, the block element blocking movement of the CPA to the locked position when the transmission element is in the disconnected position. For example, a block element is provided on the CPA or on an outer surface of the connector. Advantageously, a locking element is provided on the CPA, as this minimizes modifications to the housing. For example, the block element can be used to interact with the locking element. The block element can block movement of the CPA to the locked position when the locking element is in a not-release position. For example, the block element protrudes from the connector end in the connecting direction of the mating direction, hereinafter referred to as the mating connection direction.

A fourth aspect relates to a connector described above in the first to third aspects, wherein the connector comprises an engagement element at the connector end, the engagement element and the CPA in the locked position of the CPA locking the connector to the mating connector. In particular, the engagement element is provided on the housing and extends in the mating connection direction and the CPA comprises a counter-engagement to cooperate with the engagement element, wherein the counter-engagement extends in the mating disconnection direction, i.e. opposite to the mating connection direction. Further, the engagement element and the counter-engagement comprise grooves extending perpendicular to the mating direction.

A fifth aspect relates to a connector described above in the first to fourth aspects, wherein the unlocking element comprises a chamfered edge. Thus, the unlocking element has a chamfered surface. The chamfered edge is adapted to move the locking element perpendicular to the mating direction from a not-release position to a release position. The chamfered edge allows the locking element to be moved perpendicular to the mating direction by the unlocking element, which enables a flat design of the CPA.

A sixth aspect relates to a connector described above in the first to fifth aspects, further comprising a latching element, wherein the latching element is arranged at least partially at the connector end of the housing and is arranged to move the mating connector in the mating direction, i.e. in the mating connection direction, by moving it from a disengaged position to a latched position. A mechanical force can be transmitted by a latching element in order to connect the connector and mating connector. Attaching the latching element to the connector end allows the CPA to interact with a part of the latching element at the connector end. The latching element can be attached to the connector end to save space. Furthermore, a latching element enables the CPA to be used effectively in a particularly simple manner, i.e. without further mechanical components. Although the latching element can be closed when not inserted, the CPA cannot be moved and therefore remains locked. In particular, a locking element of the CPA is then not loaded with a mass.

A seventh aspect relates to a connector according to the sixth aspect, wherein the latching element is a lever, wherein the lever is rotatably mounted for movement about a lever axis perpendicular to the mating direction, such that the lever is movable between the disengaged position and the latched position. A lever mechanism can reduce the available installation space on the side walls of the housing. Thus, a CPA located at the connector end enables a space-optimized solution. Furthermore, a lever enables a lever force to be used to connect the connector and mating connector.

An eighth aspect relates to a connector described in the sixth and seventh aspects above, wherein the latching element comprises a handle, the handle abutting the connector end of the housing when the latching element is in the latched position. Attaching the handle of the latching element to the connector end enables the CPA to interact with the handle at the connector end. This means that the CPA can be used effectively in a particularly simple way, i.e. without further mechanical components, and the user can be signaled in a particularly simple way if the handle of the latching element is not actuated as intended, as the user would have to unlock the CPA by the handle.

A ninth aspect relates to a connector according to the eighth aspect, wherein the CPA is arranged on the handle and the handle has a handle passageway, wherein the unlocking element can be passed through the handle passageway. Thus, the CPA can be arranged in a particularly space-saving manner and elements, such as a locking element of the second aspect, can be provided in the CPA.

A tenth aspect relates to a connector as described above in the eighth to ninth aspects, wherein the connector comprises a locking element according to the second aspect and/or a block element according to the third aspect, wherein the locking element and/or the block element is arranged on the handle. For example, the block element may protrude in the mating direction when the latching element is in the latched position. A block element and a locking element on the CPA enable both parts to be manufactured in one unit, namely as part of the CPA, which simplifies manufacturing.

An eleventh aspect relates to a connector described above in the first to tenth aspects, wherein the transmission element, which is for example rod-shaped, extends between a mating connector end and the connector end, wherein the mating connector end of the transmission element protrudes through the mating connector passageway and comprises a fixing element at the mating connector end, wherein the fixing element protrudes perpendicular to the mating direction to restrict movement of the transmission element in the mating direction. This allows the transmission element to be fixed in the housing of the connector. No further modification to the mating connector is required.

A twelfth aspect relates to a connector described above in the first to eleventh aspects, wherein the CPA at the connector end is movable perpendicularly to the mating direction between the open position and the locked position. This enables the CPA to be constructed flat, which is enabled by the vertical movement of the CPA.

A thirteenth aspect relates to a connector described above in the first to twelfth aspects, wherein the connector comprises a channel, wherein the transmission element is supported in the channel, and wherein the channel is provided insulated from a line in the housing. The channel with the transmission element is open to the environment through the passageways. The channel is the transmission path closed off in the housing from the connector end to the mating connector end of the housing. Solids such as dirt, fluids such as water or electromagnetic radiation such as optical light can penetrate from the outside. The insulation, for example electrical, hermetic, electromagnetic and/or optical insulation, makes the channel advantageous for high-voltage applications and/or applications in information transmission, for example, as the contact points can be particularly protected from external influences.

A fourteenth aspect relates to a connector system comprising a connector described above in the first to thirteenth aspects, and a mating connector.

A fifteenth aspect relates to a connector system according to the fourteenth aspect, wherein the mating connector comprises a pin header or is a pin header. A pin header without further devices with safety requirements can be connected to the connector here, as the connector already comprises a CPA. The mating connector can thus be simple, namely a pin header.

A pin header is a mating connector with, for example, several pin contacts arranged in series. Its purpose is to establish a connection with many contacts from a mating connector to a connector.

For a better understanding of the present invention, it is explained in more detail with reference to the embodiments shown in the following figures. The same parts are provided with the same reference signs and the same component designations. Furthermore, some features or combinations of features from the different embodiments shown and described may represent independent inventive solutions or solutions according to the invention.

DETAILED DESCRIPTION OF THE INVENTION

Figure 1:
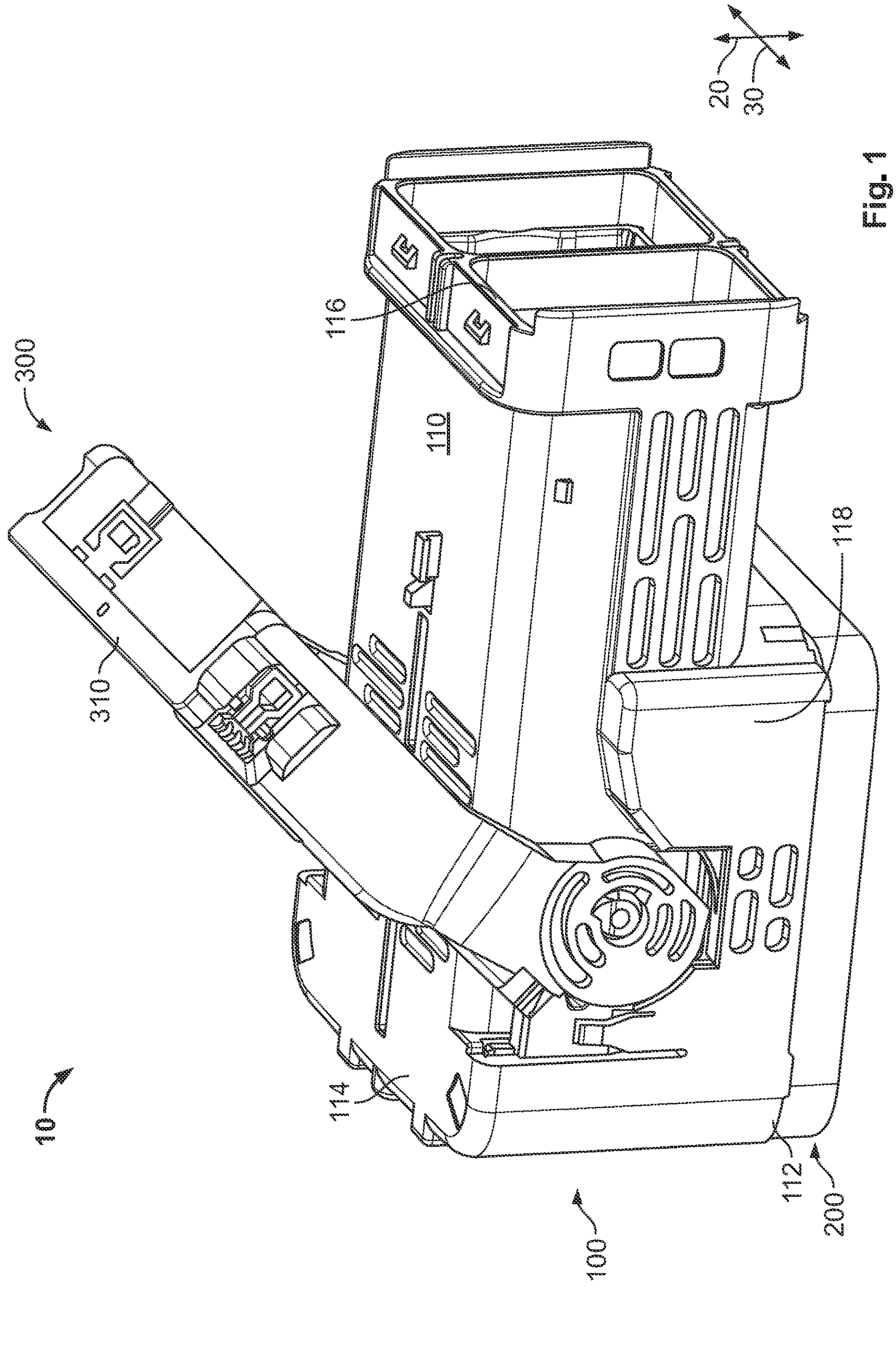
FIG. 1 a perspective view of a connector system with a latching element in a disengaged position.
Figure 2:
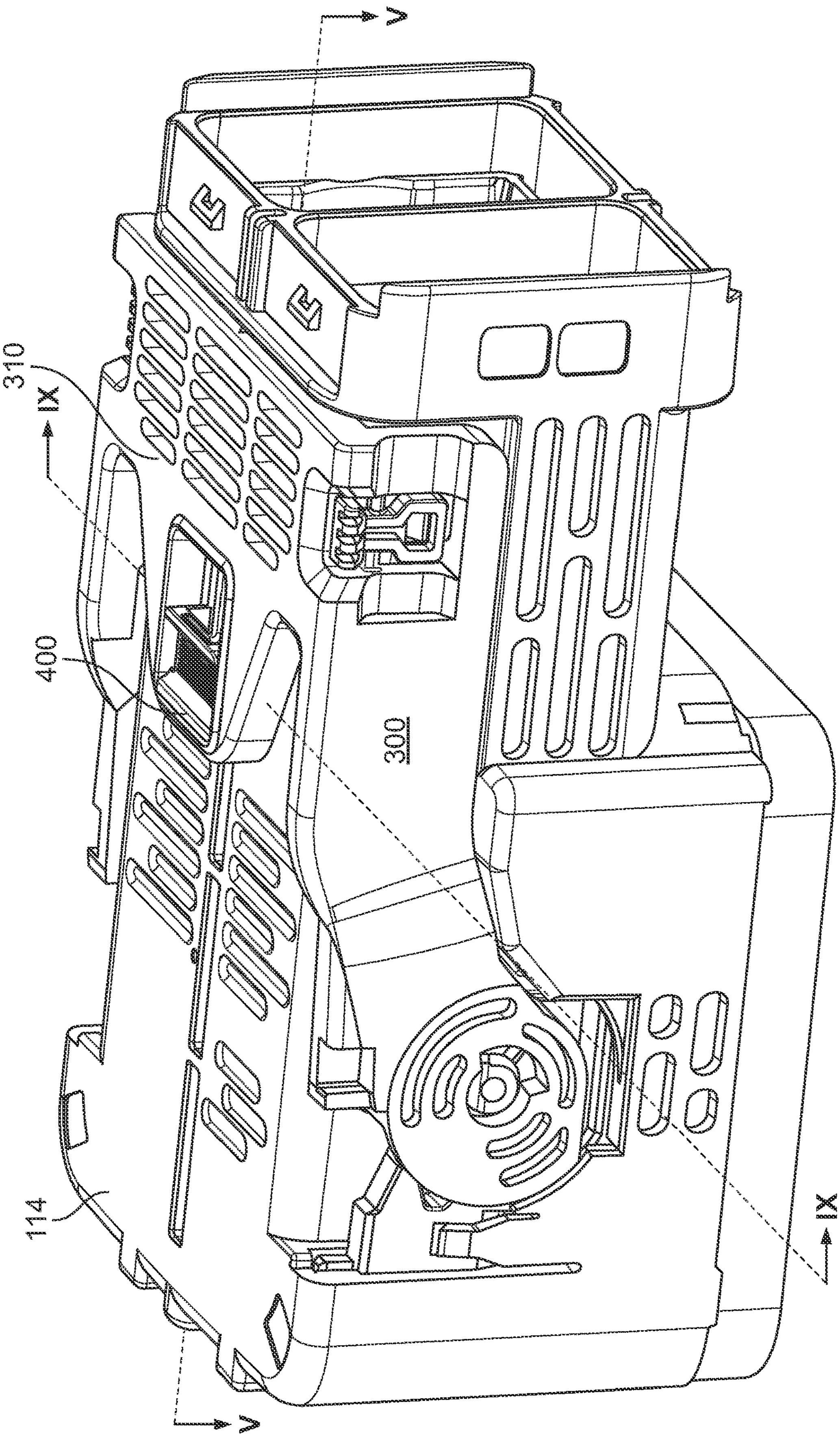
FIG. 2 a perspective view of the connector system from FIG. 1 with a latching element in a latched position and a CPA in an open position.
Figure 3:
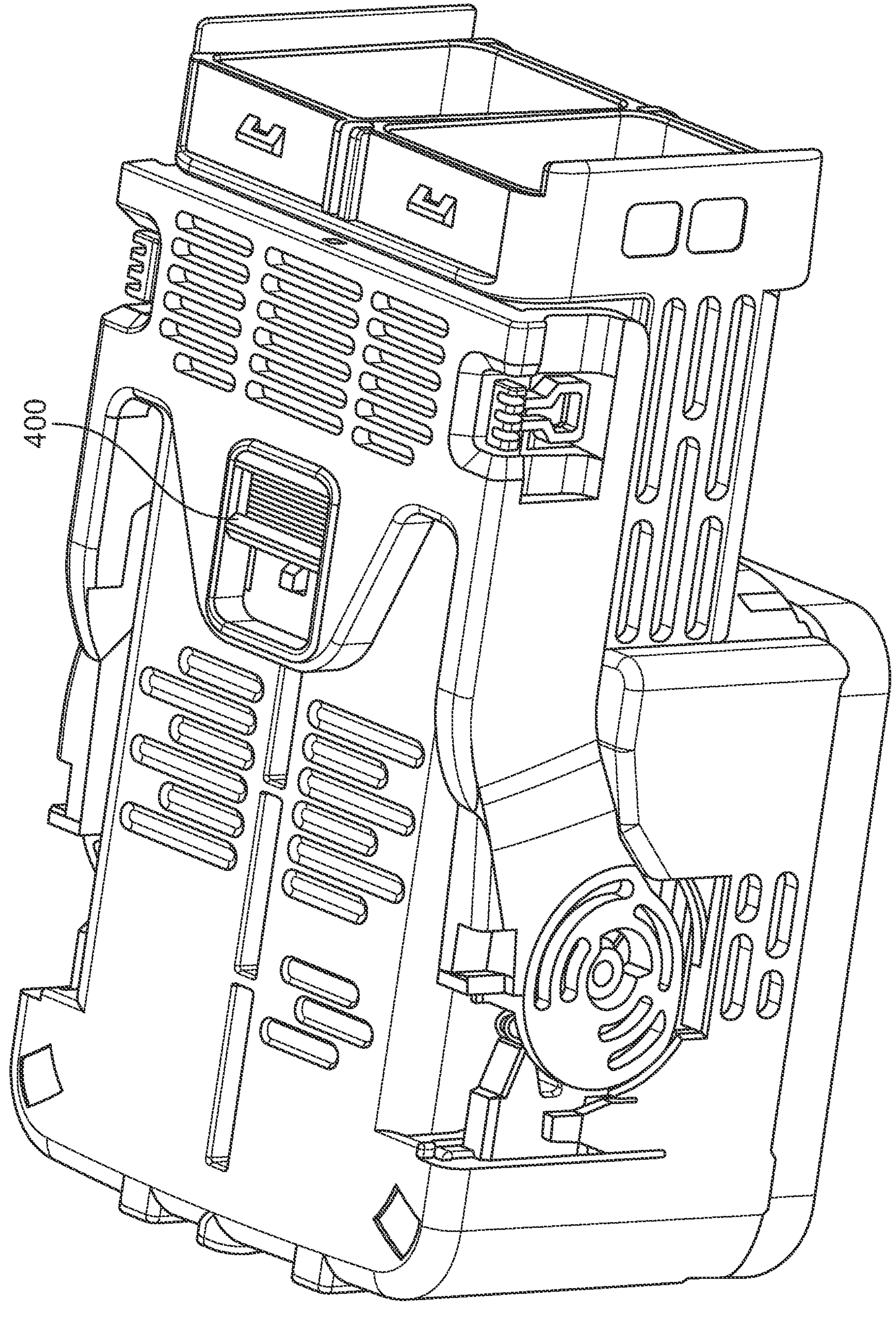
FIG. 3 a perspective view of the connector system from FIG. 2, with the CPA in a locked position.

The connector is now described with the help of the figures. FIGS. 1 to 3 show perspective views of a connector system 10 with a connector 100 and a mating connector 200.

FIG. 1 is a perspective view of a connector system 10 with a latching element 300 in a disengaged position. FIG. 2 is a perspective view of the connector system of FIG. 1 with a latching element in a latched position and a CPA 400 in an open position. FIG. 3 is a perspective view of the connector system of FIG. 2, with the CPA 400 in a locked position.

For example, as shown in FIG. 1, the connector 100 has a housing 110, the housing 110 extending in a mating direction 20 between a mating connector end 112, to which the mating connector 200 is connected in FIGS. 1 to 3, and an opposite connector end 114. In FIGS. 1 to 3, a mating connector receptacle of the connector 100 is completely filled by the mating connector 200.

The housing 110 has an outer surface and an opposite inner surface. The inner surface encloses an inner space, whereby the inner space is used to contact lines of the connector with lines of the mating connector.

As shown, for example, in FIG. 1, the housing 110 has side walls that run parallel to the mating direction 20. Here, the side walls parallel to the mating direction include a cable side wall 116 having a cable area for routing lines out of the connector 100. Further, the housing 110 has a first lever contact wall 118 having a latching area for arranging the latching element 300. Hidden in the perspective view are a rear side wall opposite the cable side wall 116 and a second lever contact wall opposite the first lever contact wall. The connector end 114 is thus a housing region of the connector 200 that is remote from the mating connector end 112, as it is opposite thereto.

As shown in FIG. 2, the latching element 300 is arranged at least partially at the connector end 114 of the housing, namely a handle 310 rests against the connector end 114 in the latched position. The handle 310 is for actuation by a user. As shown in FIG. 1, the latching element is arranged to also assume a disengaged position and can be moved into the latched position shown in FIGS. 2 and 3, for example by a user.

As shown in FIGS. 1 to 3, the latching element 300 may be a lever, the lever being rotatably mounted for movement about a lever axis 30 perpendicular to the mating direction 20 so that the lever is movable between the disengaged position and the latched position.

Further, the connector 100 includes connector position assurance (CPA) 400 for securing the contact position, which is provided at the connector end 114. As shown in FIG. 2, the CPA 400 may be in an open position in which the connector and the mating connector are separable. Further, as shown in FIG. 3, the CPA 400 may be in a locked position in which the connector and the mating connector are locked.

Figure 4:
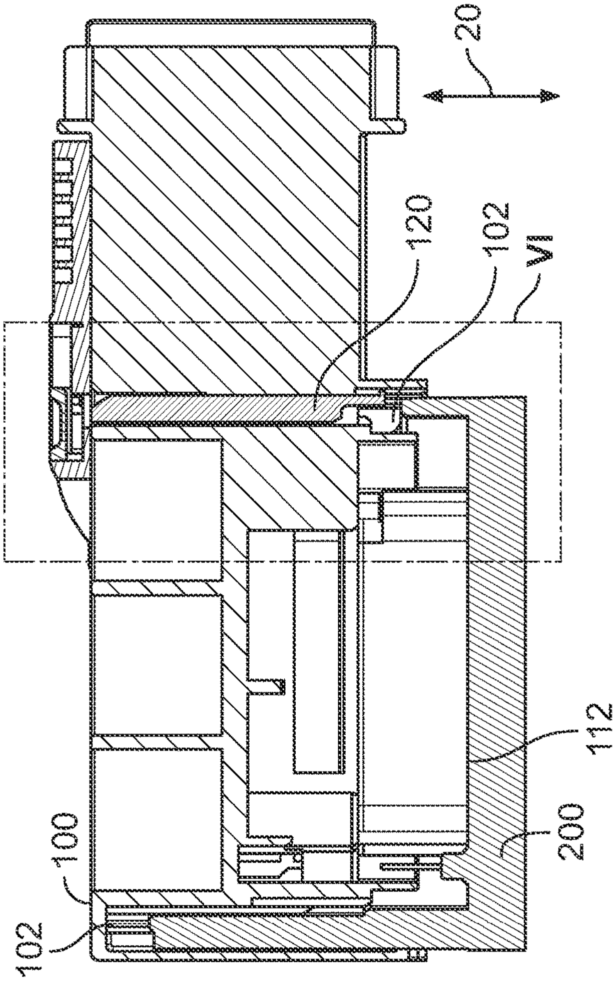
FIG. 4 a sectional view corresponding to the sectional axis V-V of the connector system in FIG. 2, where the connector and the mating connector are not connected and the locked position of the CPA is not released.
Figure 5:
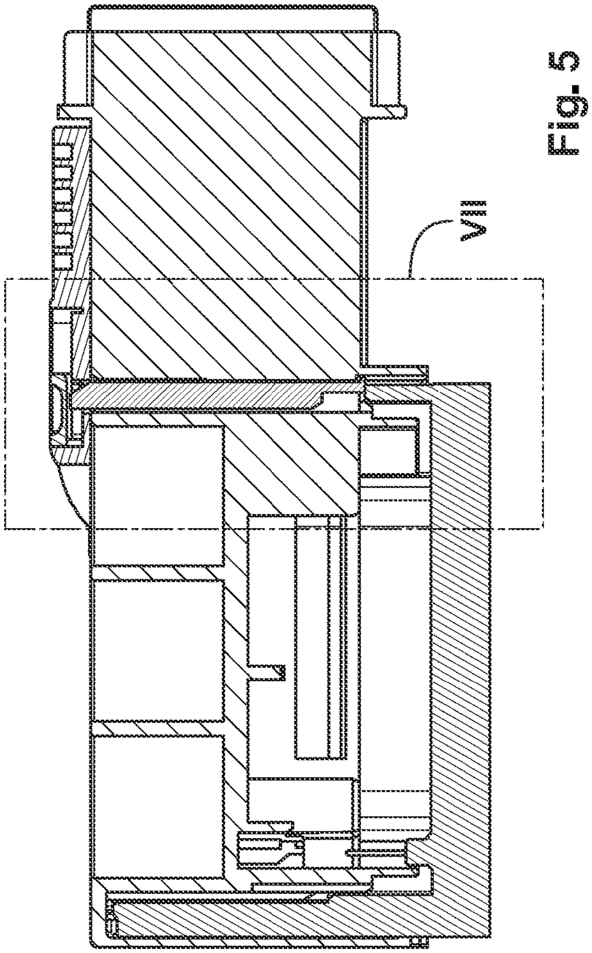
FIG. 5 a sectional view of the connector system along the sectional axis V-V of FIG. 2, with the locked position of the CPA released.

A transmission element 120 of the connector 100 is first described in particular with reference to FIGS. 4 and 5. FIG. 4 is a sectional view corresponding to the connector system of FIG. 2 along the line V-V, whereby, unlike in FIG. 2, the connector 100 and the mating connector 200 are not connected. Thus, the locked position of the CPA is not released. In particular, as shown in FIG. 4, the mating connector receptacle 102 provided at the mating connector end 112 of the connector 100 does not fully receive the mating connector 200. The connector 100 and the mating connector 200 are therefore not correctly connected. In particular, this can happen even though the latching element 300 is in the engaged position shown in FIGS. 2 and 3.

FIG. 5 then shows a sectional view of the connector system along the sectional axis V-V of FIG. 2. Here, the connector 100 and the mating connector 200 are correctly connected. The transmission element 120 then enables the locked position of the CPA 400 to be released.

As shown in FIGS. 4 and 5, the transmission element 120 extends along the mating direction 20. FIG. 4 shows the transmission element 120 in a disconnected position, in which the connector 100 and the mating connector 200 are disconnected. FIG. 5 shows the transmission element 120 in a mated position, in which the connector 100 and the mating connector 200 are connected.

Figure 7:
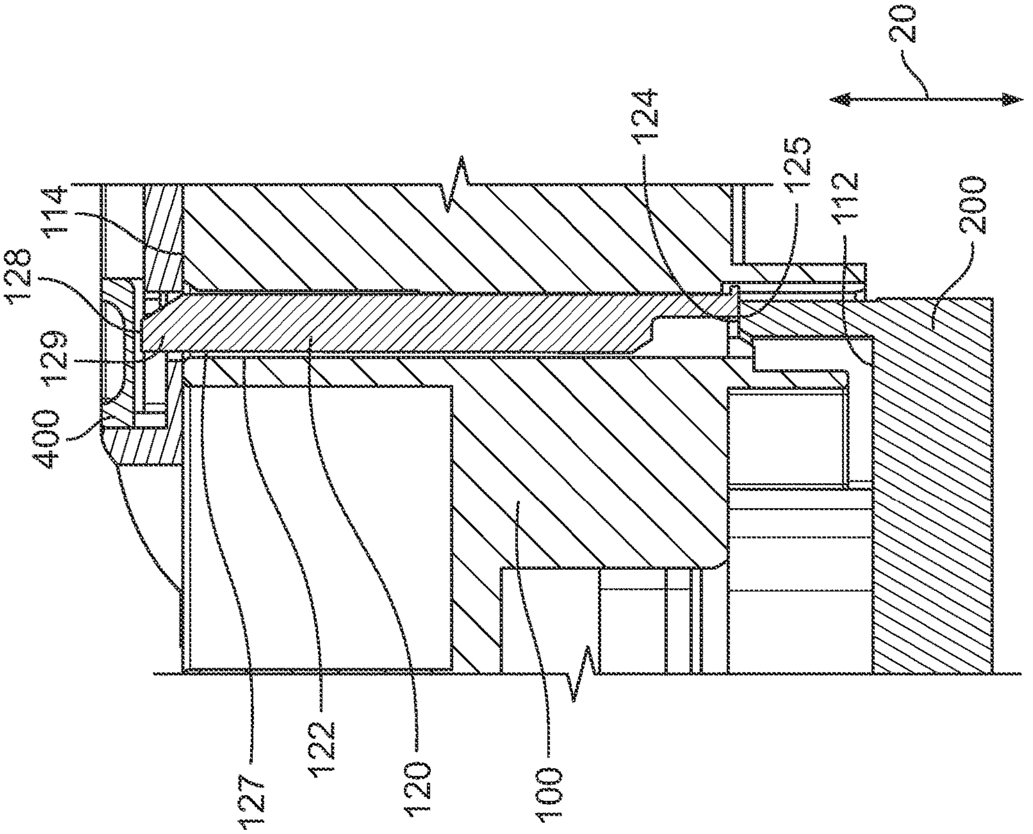
FIG. 7 a detail VII of FIG. 5.
Figure 6:
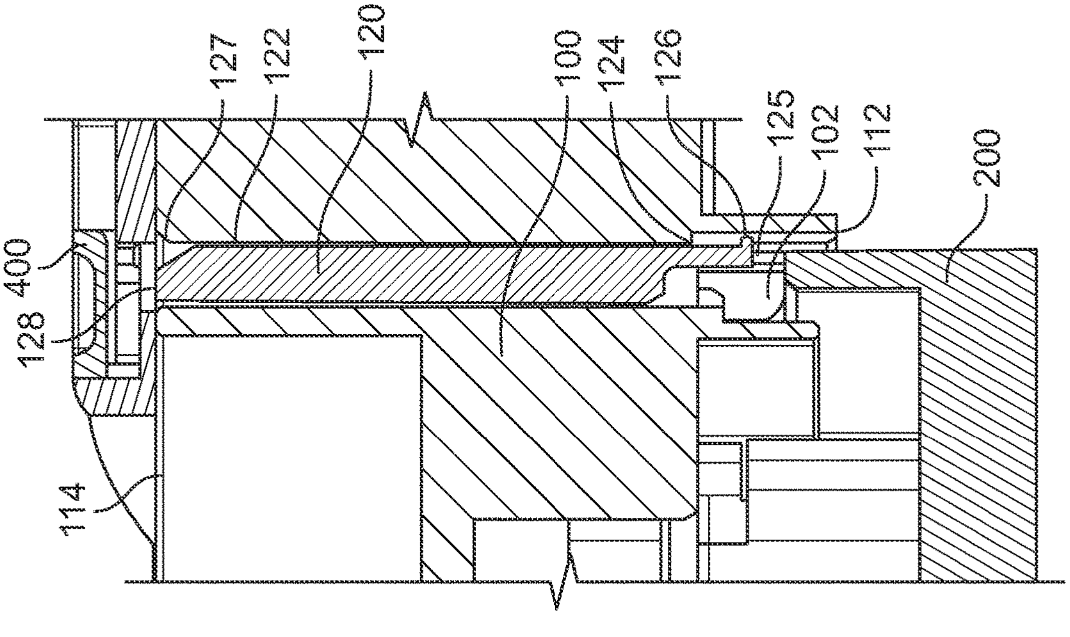
FIG. 6 a detail VI of FIG. 4.

FIG. 6 shows detail VI from FIG. 4 and FIG. 7 shows detail VII from FIG. 5. As can be seen in FIGS. 6 and 7, the transmission element 120 is movably mounted in a channel 122 in the connector 100. The position of the transmission element 120 is fixed by the mating connector 200. The channel 122 may be provided insulated from a line not shown, for example a high-voltage electrical connection, in the housing.

As shown here, the transmission element 120 may be rod-shaped. It extends between a transmission element mating connector end 125 and a transmission element connector end 128. The rod is long in the mating direction 20 and narrow perpendicular to the mating direction 20.

A mating connector passageway 124 is provided at the mating connector end 112 of the housing. In other words, the channel 122 is open to the mating connector receptacle 102 at the mating connector end 112. The mating connector passageway 124 allows the mating connector 200 to interact with the transmission element 124.

The transmission element mating connector end 125 may protrude through the mating connector passageway 124, and may include a fixing element 125 at the transmission element mating connector end 124. The fixing element 124 protrudes perpendicular to the mating direction 20 to restrict the movement of the transmission element 120 in the mating direction 20. In FIGS. 6 and 7, the fixing element 124 is perpendicular to the mating direction 20 and to the lever axis.

As shown in FIG. 6, the transmission element 120 may be in the disconnected position. The mating connector 200 is not in contact with the transmission element 120. In other words, the mating connector 200 is not fully received in the mating connector receptacle 102. In other words, the mating connector 200 does not contact the transmission element 120, in particular the transmission element mating connector end 124.

As shown in FIG. 7, the transmission element 120 can be in the mated position. The mating connector 200 and the connector 100 are correctly connected. Thus, the mating connector receptacle is filled by the mating connector 200. In other words, the mating connector is in contact with the transmission element 120, in particular the transmission element mating connector end 124.

A connector end passageway 127 is provided at the connector end 114 of the housing. In other words, the channel 122 is open to the outer surface of the housing at the connector end 114. The connector end passageway 127 allows an unlocking element 129 to pass therethrough. The unlocking element 129 is connected to the transmission element 120. Here, the unlocking element 129 is formed integrally with the transmission element 120.

As shown in FIG. 6, and explained later with reference to FIGS. 8 to 10, the unlocking element 129 prevents the CPA 400 from being movable into the locked position when the transmission element 120 is in the disconnected position. In particular, the transmission element connector end 128 here does not protrude from the housing at the connector end 114. The CPA 400 is not influenced by the unlocking element 129.

As shown in FIG. 7, and explained later with FIGS. 8 to 10, the unlocking element 129 in the mated position of the transmission element 120 enables the CPA 400 to be moved into the locked position. Here, the transmission element connector end 128 protrudes from the housing at the connector end 114, namely into the CPA 400. The CPA 400 is thus influenced by the unlocking element 129.

Figure 9:
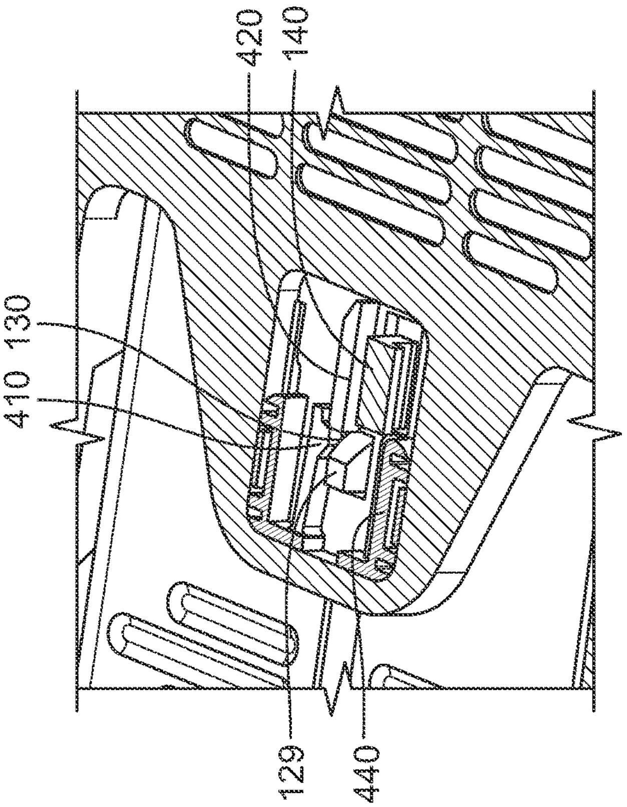
FIG. 9 a sectional view of the connector system along the sectional axis IX-IX of FIG. 2, with the locked position of the CPA released.
Figure 10:
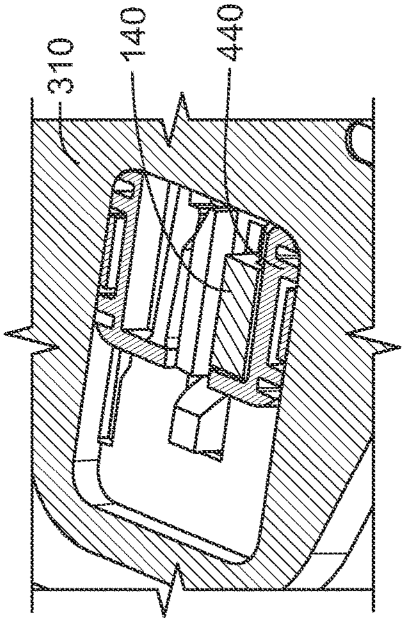
FIG. 10 a sectional view of the connector system of FIG. 3.
Figure 8:
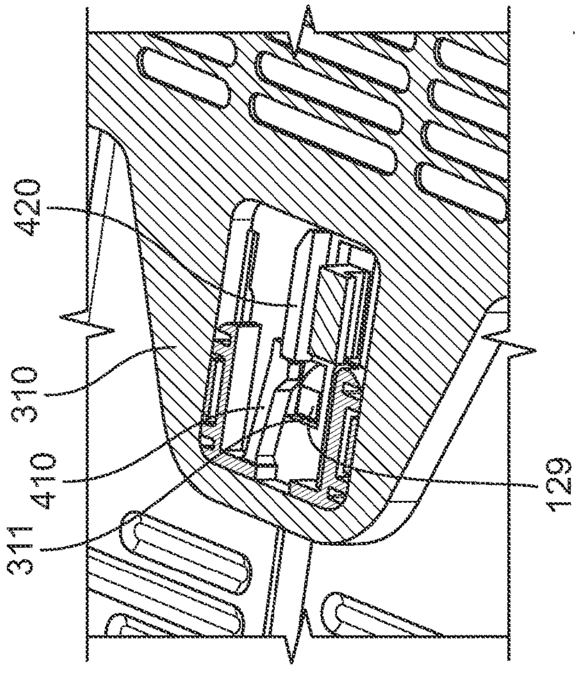
FIG. 8 a sectional view corresponding to the sectional axis IX-IX of the connector system of FIG. 2, whereby the connector and the mating connector are not connected and the locked position of the CPA is not released.

The CPA of the connector 100 is now described in particular with FIGS. 8 to 10. FIG. 8 is a sectional view corresponding to the connector system of FIG. 2 along the line IX-IX, wherein the connector 100 and the mating connector 200 are not connected and the locked position of the CPA is not released. This means that the components are in the same position as described in FIGS. 4 and 6.

FIG. 9 shows a sectional view of the connector system along the sectional axis IX-IX of FIG. 2, with the connector 100 and the mating connector 200 correctly connected. The transmission element 129 allows the locked position of the CPA to be released. This means that the components are in the same position as described in FIGS. 5 and 7.

In FIGS. 8 to 10, the CPA is arranged in the handle 310. The handle 310 has a handle passageway 311, wherein the unlocking element 129 can be passed through the handle passageway 311. In particular, the handle passageway 311 aligns with the connector passage when the latching element 300 is in the engaged position so that the unlocking element 129 is passable.

In particular, the CPA has a locking element 410 for interacting with the unlocking element 129. FIG. 8 shows the locking element 410 in a not-release position. FIG. 9 shows the locking element 410 in a release position. As shown in FIG. 9, the unlocking element 129 moves the locking element 410 from the not-release position and the release position.

To enable the unlocking element 129 to move the locking element 410 perpendicular to the connector direction from a not-release position to a release position, the unlocking element has a chamfered edge 130. Thus, this arrangement enables the CPA at the connector end to be movable perpendicular to the mating direction between the open position and the locked position.

Further, the CPA comprises a block element 420. The block element 420 is connected to the handle 310 via the CPA. As shown in FIGS. 8 to 10, the block element 420 protrudes in the mating direction when the latching element is in the latched position.

As shown in FIG. 8, the block element 420 blocks movement of the CPA to the locked position when the transmission element is in the disconnected position, so here the unlocking element 129 does not protrude into the CPA. As shown in FIG. 9, the block element 420 does not block a movement of the CPA to the locked position when the transmission element is in the mated position, thus here the unlocking element 129 protrudes into the CPA. The locking element 410 is therefore in the release position and movement of the CPA into the locked position, shown in FIG. 10, is possible.

Furthermore, the connector comprises an engagement element 140 at the connector end, as shown in FIG. 9. The CPA comprises a corresponding counter-engagement 440. The engagement element 140 and the counter-engagement 440 have grooves that are perpendicular to the mating direction.

As shown in FIG. 10, the engagement element 140 and the mating engagement 440 interact in the locked position of the CPA such that the connector is locked to the mating connector. In particular, the handle 310 can no longer be moved to the disengaged position. A user must consciously move the CPA back from the locked position to the open position.

Figure 11:
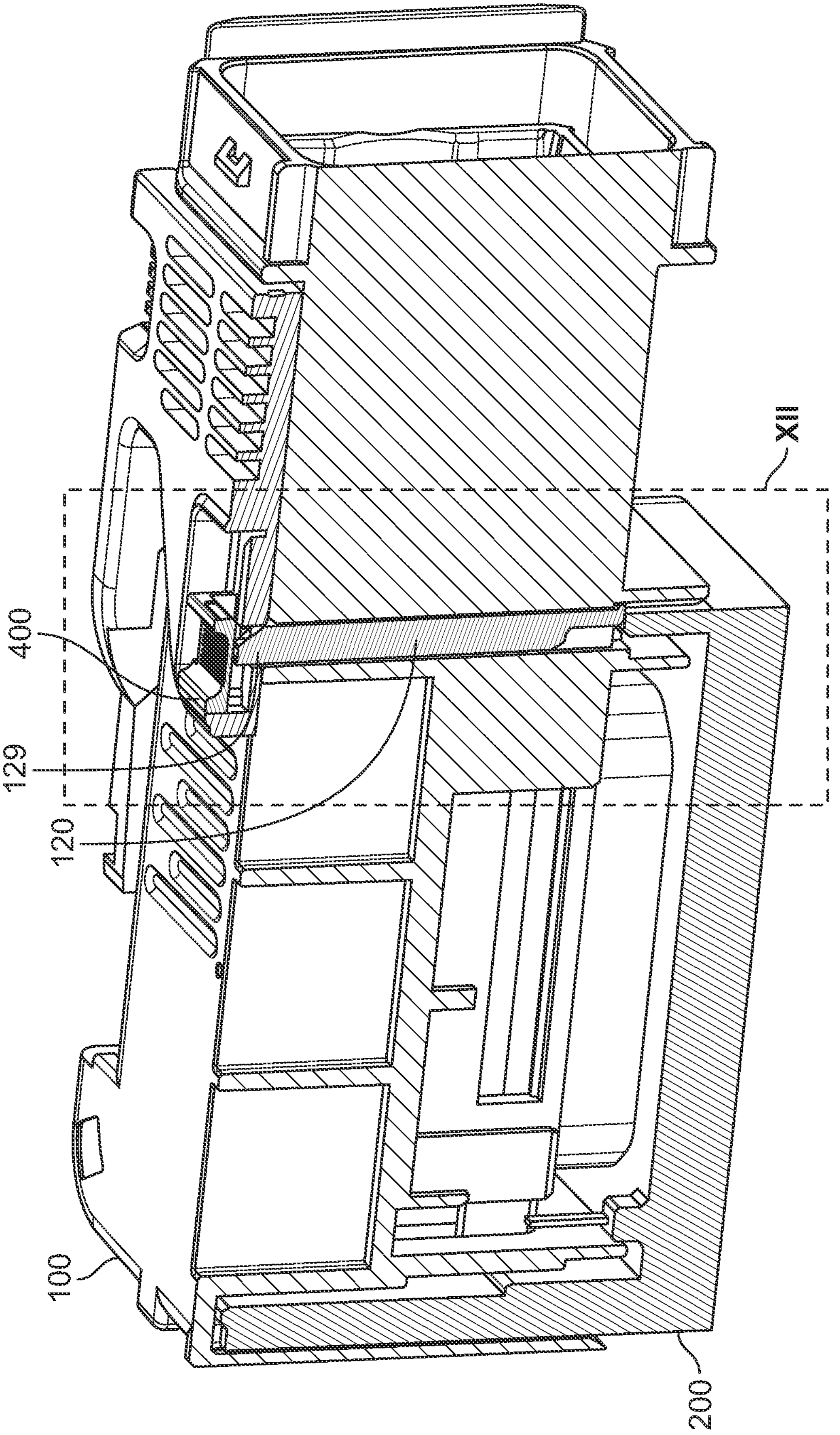
FIG. 11 a perspective view of FIG. 5.
Figure 12:
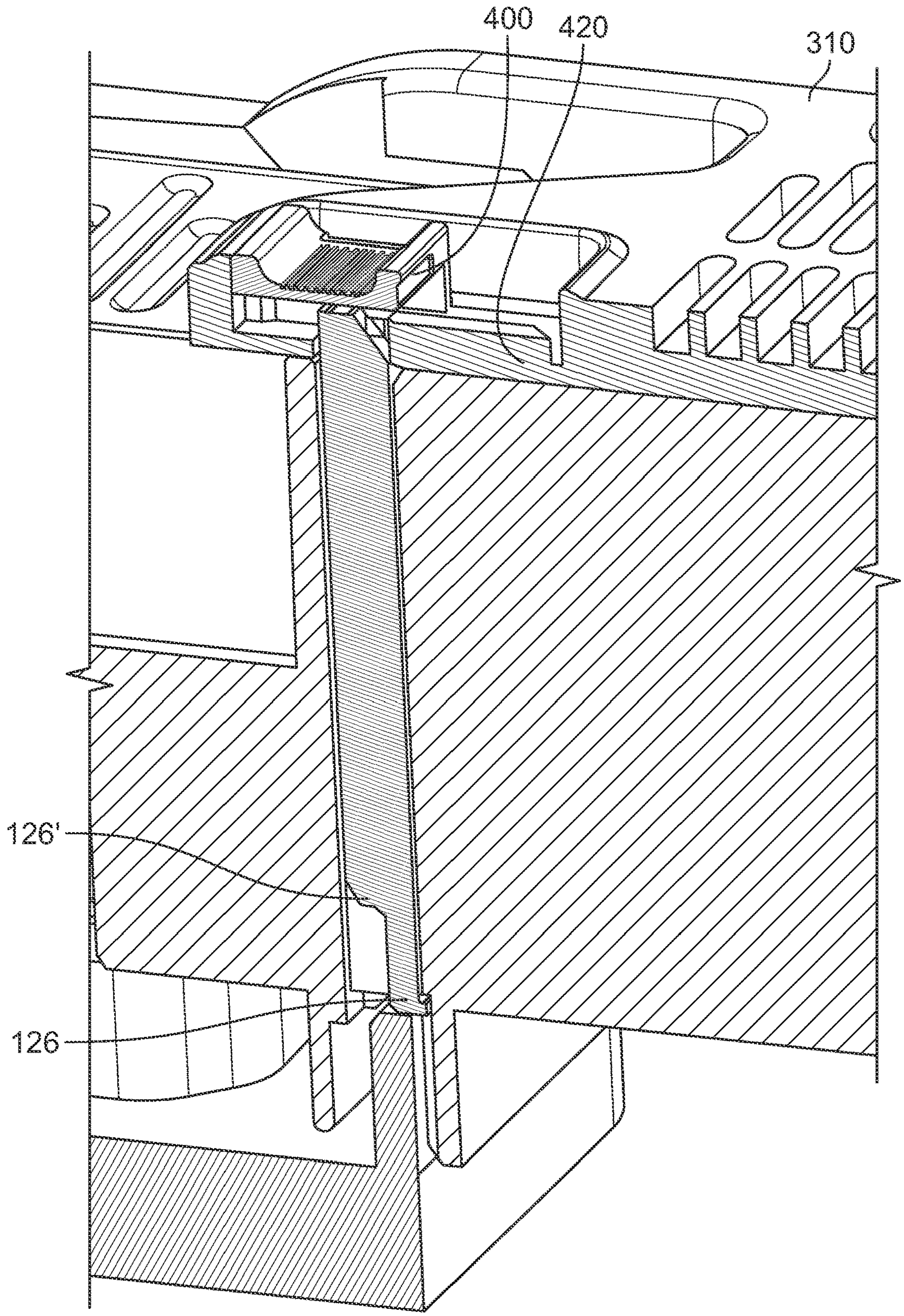
FIG. 12 a detail of FIG. 11.

FIG. 11 is a further perspective view of FIG. 5. FIG. 12 shows detail XII of FIG. 11. In particular, it can be seen from FIG. 12 that the block element 420 can be manufactured in one piece with the handle 310. The locking element 410 can also be manufactured in one piece with the handle 310.

Furthermore, it can be seen that the CPA 400 comprises a finger actuation unit for easily moving the CPA by a user's finger. Here, the CPA 400 may also be non-detachably connected to the handle 310. Non-detachably connected means that the two components cannot be disconnected without the use of force thereby for example destroying the pieces.

Furthermore, it can be seen that the fixing element 126 and a counter-fixing element 126' restrict the movement of the transmission element between the mated and disconnected position. In particular, the transmission element and the housing are non-detachably connected.

Even if not shown in the figures, the latching element does not necessarily have to be provided. Furthermore, an alternative latching element such as a sliding element can also be provided as a latching element instead of a lever as a latching element.

Even if not shown in the figures, the unlocking element does not necessarily have to be integrally formed with the transmission element. It can also be part of the CPA.

Although not shown in the figures, the mating connector may comprise a pin header or be a pin header.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. Connector for connecting to a mating connector, the connector comprising:

- a housing, wherein the housing extends in a mating direction between a mating connector end for connection to the mating connector and an opposite connector end,
- a connector position assurance, CPA, for securing the contact position of the connector on the mating connector, wherein the CPA is provided at the connector end and wherein the CPA is adapted to be movable between an open position, in which the connector and the mating connector are separable, and a locked position, in which the connector and the mating connector are locked,
- a transmission element which extends along the mating direction and is mounted movably relative to the housing between a mated position, in which the connector and the mating connector are connected, and a disconnected position, in which the connector and the mating connector are disconnected,
- a mating connector passageway at the mating connector end of the housing, the mating connector passageway being arranged to cause the mating connector to cooperate with the transmission element so that the transmission element is moved from the disconnected position to the mated position when the mating connector and the connector are connected,
- a connector end passageway at the connector end of the housing for passing an unlocking element connected to the transmission element, wherein in the disconnected position of the transmission element, the unlocking element prevents the CPA from being movable to the locked position, and wherein in the mated position of the transmission element, the unlocking element allows the CPA to be movable to the locked position.

2. Connector according to claim 1, wherein the connector comprises a locking element at the connector end for cooperating with the unlocking element, wherein the locking element is movable by the unlocking element between a not-release position and a release position, wherein the release position of the locking element enables the movement of the CPA into the locked position.

3. Connector according to claim 1, wherein the connector comprises a block element at the connector end, wherein the block element blocks a movement of the CPA to the locked position when the transmission element is in the disconnected position.

4. Connector according to claim 1, wherein the connector comprises an engagement element at the connector end, wherein the engagement element and the CPA lock the connector to the mating connector in the locked position of the CPA.

5. Connector according to claim 1, wherein the unlocking element comprises a chamfered edge, wherein the chamfered edge is adapted to move a locking element perpendicular to the mating direction from a not-release position to a release position.

6. Connector according to claim 1, further comprising a latching element, wherein the latching element is arranged at least partially at the connector end of the housing and is arranged to move the mating connector in the mating direction by moving it from a disengaged position to a latched position.

7. Connector according to claim 6, wherein the latching element is a lever, wherein the lever is rotatably mounted movably about a lever axis perpendicular to the mating direction, so that the lever is movable between the disengaged position and the latched position.

8. Connector according to claim 6, wherein the latching element comprises a handle, wherein the handle abuts against the connector end of the housing in the latched position of the latching element.

9. Connector according to claim 8, wherein the CPA is arranged on the handle and the handle has a handle passageway, wherein the unlocking element can be passed through the handle passageway.

10. Connector according to claim 8, wherein the connector comprises a block element at the connector end and a locking element at the connector end for cooperating with the unlocking element, the block element blocks a movement of the CPA to the locked position when the transmission element is in the disconnected position, the locking element being movable by the unlocking element between a not-release position and a release position, wherein the release position of the locking element enables the movement of the CPA into the locked position, wherein at least one of the locking element and the block element is arranged on the handle and protrudes in the mating direction in the latched position of the latching element.

11. Connector according to claim 1, wherein the transmission element extends between a transmission element mating connector end and a transmission element connector end, wherein the transmission element mating connector end protrudes through the mating connector passageway and comprises a fixing element at the transmission element mating connector end, wherein the fixing element protrudes perpendicular to the mating direction to restrict the movement of the transmission element in the mating direction.

12. Connector according to claim 1, wherein the CPA at the connector end is movable perpendicular to the mating direction between the open position and the locked position.

13. Connector according to claim 1, wherein the connector comprises a channel, wherein the transmission element is supported in the channel, and wherein the channel is provided insulated from a line in the housing.

14. Connector system comprising:

a connector and a mating connector removably coupled to the connector, the connector comprising:

a housing, wherein the housing extends in a mating direction between a mating connector end for connection to the mating connector and an opposite connector end, a connector position assurance, CPA, for securing the contact position of the connector on the mating connector, wherein the CPA is provided at the connector end and wherein the CPA is adapted to be movable between an open position, in which the connector and the mating connector are separable, and a locked position, in which the connector and the mating connector are locked, a transmission element which extends along the mating direction and is mounted movably relative to the housing between a mated position, in which the connector and the mating connector are connected, and a disconnected position, in which the connector and the mating connector are disconnected, a mating connector passageway at the mating connector end of the housing, the mating connector passageway being arranged to cause the mating connector to cooperate with the transmission element so that the transmission element is moved from the disconnected position to the mated position when the mating connector and the connector are connected, a connector end passageway at the connector end of the housing for passing an unlocking element connected to the transmission element, wherein in the disconnected position of the transmission element, the unlocking element prevents the CPA from being movable to the locked position, and wherein in the mated position of the transmission element, the unlocking element allows the CPA to be movable to the locked position.

15. Connector system according to claim 14, wherein the mating connector comprises a pin header.

16. Connector system according to claim 14, wherein the connector comprises a locking element at the connector end for cooperating with the unlocking element, wherein the locking element is movable by the unlocking element between a not-release position and a release position, wherein the release position of the locking element enables the movement of the CPA into the locked position.

17. Connector system according to claim 14, wherein the connector comprises a block element at the connector end, wherein the block element blocks a movement of the CPA to the locked position when the transmission element is in the disconnected position.

18. Connector system according to claim 14, wherein the connector comprises an engagement element at the connector end, wherein the engagement element and the CPA lock the connector to the mating connector in the locked position of the CPA.

19. Connector system according to claim 14, further comprising a latching element, wherein the latching element is arranged at least partially at the connector end of the housing and is arranged to move the mating connector in the mating direction by moving it from a disengaged position to a latched position.

20. Connector system according to claim 14, wherein the transmission element extends between a transmission element mating connector end and a transmission element connector end, wherein the transmission element mating connector end protrudes through the mating connector passageway and comprises a fixing element at the transmission element mating connector end, wherein the fixing element protrudes perpendicular to the mating direction to restrict the movement of the transmission element in the mating direction.

* * * * *